US008006898B2

(12) United States Patent
Reinisch et al.

(10) Patent No.: US 8,006,898 B2
(45) Date of Patent: Aug. 30, 2011

(54) METHOD FOR VERIFYING THE AUTHENTICITY OF DOCUMENTS

(75) Inventors: Helmut Karl Reinisch, München (DE); Karl Hermann Weilacher, Hebertshausen (DE); Lukas Löffler, Deisenhofen (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 12/481,987

(22) Filed: Jun. 10, 2009

(65) Prior Publication Data

US 2009/0242627 A1 Oct. 1, 2009

Related U.S. Application Data

(63) Continuation of application No. 10/297,586, filed as application No. PCT/EP01/06579 on Jun. 11, 2001, now Pat. No. 7,552,864.

(30) Foreign Application Priority Data

Jun. 13, 2000 (DE) ................................. 100 29 051

(51) Int. Cl.
*G06Q 40/00* (2006.01)

(52) U.S. Cl. ........................................ 235/379; 209/534

(58) Field of Classification Search .................. 235/379; 209/534, 567; 194/215
See application file for complete search history.

(56) References Cited

U.S. PATENT DOCUMENTS 4,524,268 A 6/1985 Fukatsu
4,533,824 A 8/1985 Watanabe
4,830,742 A 5/1989 Takesako
5,012,932 A 5/1991 Omura et al.
5,201,395 A 4/1993 Takizawa et al.
5,230,653 A 7/1993 Shinozaki et al.
5,430,664 A 7/1995 Cargill et al.
5,617,956 A 4/1997 Werner et al.
5,678,677 A 10/1997 Baudat
5,757,001 A 5/1998 Burns
5,761,089 A * 6/1998 McInerny ..................... 702/128
5,804,804 A * 9/1998 Fukatsu et al. ................ 235/379
6,493,461 B1 12/2002 Mennie et al.
6,886,680 B2 5/2005 King
2003/0210386 A1* 11/2003 Laskowski ...................... 356/71

FOREIGN PATENT DOCUMENTS

CH 684856 1/1995
DE 27 23 078 12/1977
DE 196 18 541 11/1996
EP 01 01 115 A 2/1984
EP 06 60 276 12/1994
EP 08 05 408 A 11/1997
EP 08 45 763 A 6/1998
EP 08 81 603 A 12/1998

* cited by examiner

*Primary Examiner* — Ahshik Kim
(74) *Attorney, Agent, or Firm* — Bacon & Thomas, PLLC

(57) ABSTRACT

The invention relates to a method for testing the authenticity of documents, in particular bank notes, documents of value or security documents, by authenticity criteria. To increase the reliability of authenticity testing of documents, at least two different authenticity classes each with one or more authenticity criteria are provided, the individual authenticity classes differing in at least one authenticity criterion. An authenticity class is selected from the different authenticity classes and the document tested by the authenticity criteria of the selected authenticity class. The document is assigned the selected authenticity class if the document meets the authenticity criteria thereof. This obtains higher reliability of authenticity testing since this method makes it possible to determine those documents that meet higher authenticity requirements, i.e. stricter authenticity criteria, than the other documents and are therefore authentic with higher probability.

14 Claims, 2 Drawing Sheets

METHOD FOR VERIFYING THE AUTHENTICITY OF DOCUMENTS

CROSS REFERENCE TO RELATED APPLICATIONS

Figure 1:
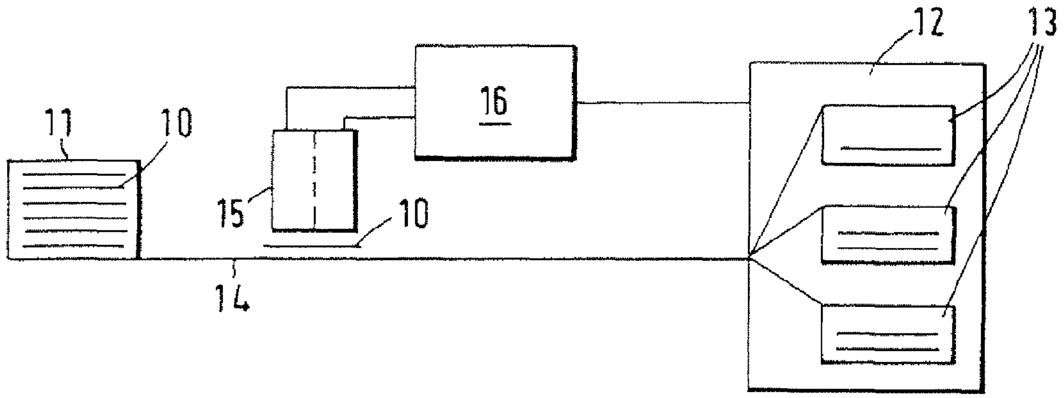

The present application is a Continuation application of U.S. patent application Ser. No. 10/297,586, filed May 7, 2003, which is a National Stage of PCT Application No. PCT/EP01/06579 filed on Jun. 11, 2001.

This invention relates to methods and apparatuses for testing the authenticity of documents, in particular bank notes, documents of value or security documents, according to the generic part of the independent claims.

Authenticity testing of documents is generally done by measuring certain authenticity features, for example optical, electric or magnetic features, on a document under test and then testing the measured authenticity features with reference to given authenticity criteria. For example, the optical reflection behavior of the document is measured as an authenticity feature and it is then tested whether the measured reflection behavior undershoots or exceeds a certain threshold value as the associated authenticity criterion. Depending on the test result the document is classified as authentic or false.

The reliability of detecting forgeries can be increased for instance by tightening the authenticity criteria in the testing of certain authenticity features, for example by raising or lowering threshold values. In practice the authenticity criteria cannot be tightened at will, however, since this would make the proportion of authentic documents not recognized as authentic—and possibly rejected or misclassified—too high.

In bank note processing machines that are used in particular in commercial banks for deposit testing and clearing, this would lead for example to elevated effort for post processing bank notes not recognized as authentic by hand and possibly further by machine.

In authenticity testing in money-depositing machines, a general tightening of authenticity criteria would mean that in particular used or soiled authentic bank notes, whose authenticity features are less distinct due to soiling or damage compared to freshly printed bank notes, are not recognized as authentic and consequently rejected or withheld as alleged forgeries, depending on the case of application.

The reliability in recognizing counterfeit bank notes is therefore limited by the required low proportion of authentic bank notes not recognized as authentic. This is problematic especially when forgeries are not recognized as such due to “loose” authenticity criteria and return to circulation, for example after one customer deposits counterfeit bank notes in self-service recycling machines and the bank notes not identified as forgeries are then issued to other customers.

The method known from DE 196 18 541 A1 relates to determining a sorting class from a number of bank note properties, such as denomination, security features and soiling. Measuring results for the bank note properties are first mapped onto discrete classes and combined in a class vector. The class vector is finally compared with individual rule vectors each corresponding to a certain sorting class. If the class vector of the bank note matches a rule vector, the bank note is assigned the sorting class corresponding to the particular rule vector. This method permits sorting classes to be determined fast and precisely. However, the derivation of a class for individual security features, i.e. the actual authenticity testing, is done by methods known from the prior art, so that the above-described problems also arise here when for example a raising or lowering of threshold values for authenticity features is intended to increase or reduce the reliability in authenticity testing.

EP 0 101 115 A1 discloses a device for recognizing bank notes wherein a digital picture of the bank note is taken and compared with a previously stored reference picture of a reference bank note. If a first comparison, in particular on one half of the bank note, does not yield a sufficiently reliable result, the comparison can be repeated in other areas of the bank note, for example with other comparative values. However, this opens up the possibility of selectively soiling or damaging security-relevant areas of a counterfeit bank note to effect a test of other areas with possibly more easily imitated security features and thus—falsely—a positive test result.

It is the problem of the present invention to state methods and apparatuses for authenticity testing that permit documents to be tested with elevated reliability, in particular without simultaneously increasing the proportion of authentic documents falsely not recognized as authentic.

This problem is solved by the authenticity testing methods according to claims 1 and 14 and by the corresponding authenticity testing apparatuses according to claims 18 and 21.

In the authenticity testing method according to claim 1, at least two different authenticity classes each with one or more authenticity criteria are provided, the individual authenticity classes differing in at least one authenticity criterion. For authenticity testing, an authenticity class is selected from the different authenticity classes and the document tested by the authenticity criteria of the selected authenticity class. The document is assigned the selected authenticity class if the document meets its authenticity criteria. The authenticity criteria are for example threshold values or intervals for the authenticity features used for testing. Authenticity features to be used are for example optical, magnetic, electric or physical features, e.g. optical reflection, transmission or emission, magnetic permeability, electric conductivity, dielectric constant, thickness and format of the document as well as watermarks.

The invention is based on the idea of combining different authenticity criteria in authenticity testing of documents into a plurality of authenticity classes, the requirements for authenticity varying in strictness depending on the authenticity class, since each authenticity class generally includes a different number of authenticity criteria and/or authenticity criteria varying in strictness. If the authenticity class selected has for example high requirements for authenticity, e.g. very high threshold values for optical reflection or transmission, the authenticity of documents meeting the authenticity criteria of this selected authenticity class can be affirmed with high probability. Documents not meeting the authenticity criteria of a selected authenticity class can be tested by other selected authenticity classes with lower requirements for authenticity, for example lower threshold values, so that their authenticity can be affirmed with accordingly lower probability. Altogether, this results in a division of the authenticity property, i.e. the measured authenticity features, of the documents under test into different authenticity classes. This differentiation of the result of authenticity testing makes it possible to determine those documents that are authentic with higher probability than in prior art authenticity testing methods, thereby altogether increasing the reliability of determining authenticity. Simultaneously, the other documents can still be tested by the hitherto usual—generally “less strict”—authenticity criteria, thereby keeping the proportion of authentic documents not recognized as authentic low.

In a development of the method, it is provided that the fitness and/or denomination of the document is determined and the authenticity class then selected in dependence on the fitness and/or denomination of the document. Denomination is the value or currency of the document under test. Fitness of the document is generally given by fitness features such as degree of soiling, limpness, damage, such as tears, holes or faulty places in the printed image, and foreign bodies, such as adhesive tape. For example, the authenticity class can be selected in the authenticity testing of a document in dependence on the degree of soiling of the document, whereby clean and undamaged documents can be tested by much stricter authenticity criteria, e.g. higher threshold values, than very soiled or damaged documents. This clearly increases the reliability of recognizing forgeries in clean or slightly soiled documents. Altogether, this fitness-dependent authenticity testing permits documents with high fitness to be identified as authentic or false with high reliability. Since only the testing of documents with high fitness is tightened, the proportion of authentic documents not recognized as authentic simultaneously remains low.

A further aspect of the invention is according to claim 14 that a portion of the authenticity criteria used for testing authenticity is determined on counterfeit documents. This extends authenticity testing with defined authenticity criteria by additional authenticity testing with additional authenticity criteria, the additional authenticity criteria being determined on counterfeit documents. The additional authenticity criteria are generally determined in a separate method, e.g. in specially provided devices, wherein counterfeit documents are tested in particular for characteristic differences over authentic documents. Additional authenticity criteria are determined from the found differences and then supplied to the authenticity testing method. Documents are still tested here by fixed authenticity criteria and classified as authentic if they meet the authenticity criteria. In addition, forgeries can be recognized if the tested documents do not meet the additional authenticity criteria determined on known forgeries, said criteria preferably relating to characteristic differences between a found forgery and authentic documents. This achieves elevated reliability in the recognition of forgeries, in particular with respect to known forgeries that are in circulation.

Figure 2:
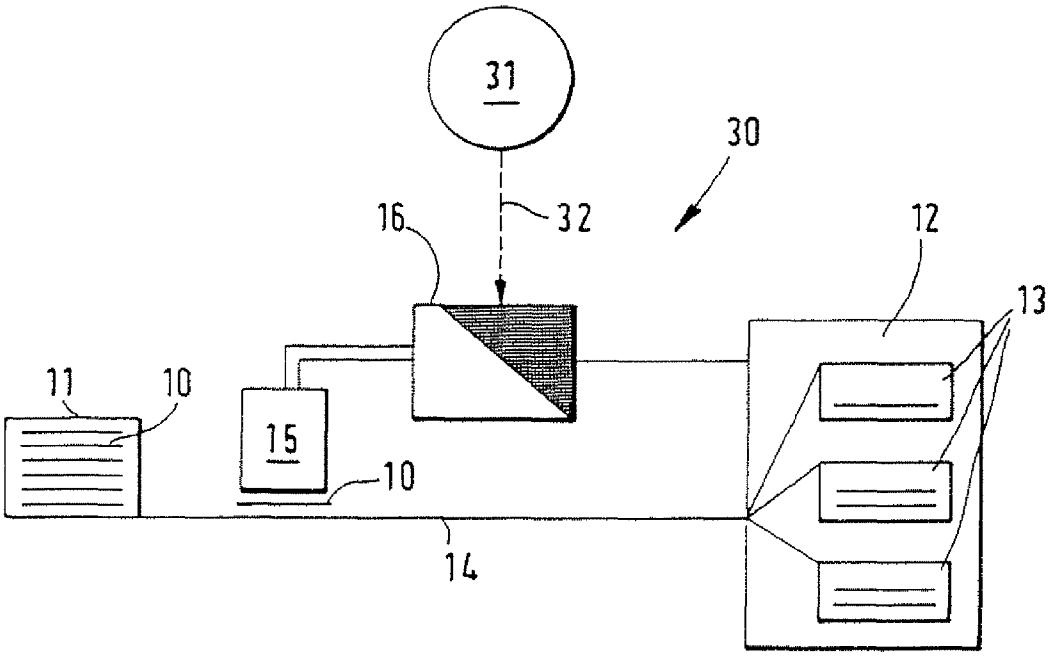
Figure 3:
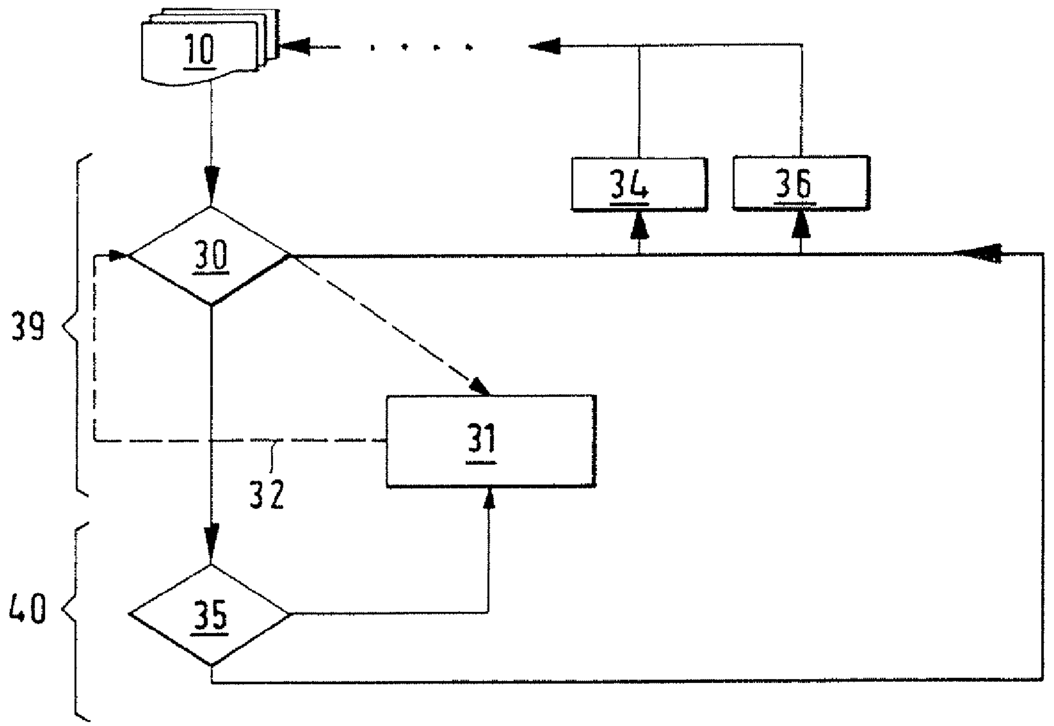

The invention will now be explained in more detail with reference to examples shown in figures, in which FIG. 1 shows the schematic structure of an apparatus for inventive authenticity testing of documents;

FIG. 2 shows the schematic structure of an authenticity testing system using authenticity criteria determined on counterfeit documents, and FIG. 3 shows the schematic structure of a system for processing deposited bank notes.

FIG. 1 shows the schematic structure of an apparatus for inventive authenticity testing of documents. Documents 10, for example bank notes, provided in input device 11 are removed singly from input device 11 and transported with the aid of transport system 14 to output device 12. Here documents 10 are sorted into three different sorting classes and outputted into corresponding output pockets 13. On the way between input device 11 and output device 12 document 10 under test is transported past measuring device 15. Measuring device 15 measures the authenticity features of document 10 under test. It optionally also measures fitness features characterizing the fitness of document 10. The dashed line in measuring device 15 is intended to indicate that measuring device 15 can have two or optionally more components for separately measuring authenticity and possibly fitness features. It is fundamentally also possible, however, to measure both authenticity and fitness features together in one measuring device. In the shown example, measuring device 15 only measures on one side of document 10 under test. However, the apparatus can generally also be designed so as to measure document 10 from both sides, e.g. by two opposing measuring devices 15 through which document 10 is transported.

Information about the features measured in measuring device 15 is transferred to evaluation device 16 where inventive authenticity testing is done. Selection of a certain authenticity class and its assignment to document 10 under test are preferably realized by a computer program. The computer program tests for example whether an authenticity feature, e.g. optical reflection, measured on document 10 under test is greater than a threshold value for optical reflection belonging to the certain authenticity class. If the test result is positive, document 10 is assigned the certain authenticity class, e.g. by writing a number characterizing the authenticity class into a variable characterizing the authenticity of document 10. If the test result is negative, the computer program continues testing the measured authenticity feature by lower threshold values belonging to other authenticity classes, i.e. less strict authenticity criteria, and assigns document 10 a corresponding authenticity class. Altogether, this results in a division of the authenticity property, i.e. the measured authenticity features, of documents 10 under test into different authenticity classes. If all these tests deliver a negative test result, document 10 is classified as false.

In a preferred development of the method, the fitness of document 10 is additionally determined from the measured fitness features. Document 10 is then assigned one of several fitness classes characteristic of the particular fitness of the document under test. Bank note testing usually involves three fitness classes, namely unfit, fit and ATM-fit (very fit). The authenticity class is then selected in subsequent authenticity testing in dependence on the fitness class assigned to document 10 under test. ATM-fit bank notes are preferably subjected to very strict authenticity criteria, while unfit or fit bank notes have to meet less strict authenticity criteria of other authenticity classes to still be classified as authentic. To increase the reliability of authenticity testing, it is also possible to do an additional authenticity test on documents 10 of a certain fitness class, for example fit or ATM-fit bank notes. Such an additional authenticity test can be done for example on the basis of already measured data for individual authenticity features.

Denomination can fundamentally likewise be determined via measuring device 15 and evaluation device 16, but this might also be done in separate measuring and evaluation devices.

In a typical sorting mode, for example for use in a bank note processing machine for deposit testing and clearing, documents 10 are divided into one or more sorting classes and outputted into corresponding output pockets 13. Output device 12 is driven by evaluation device 16 such that a first one of output pockets 13 receives bank notes—optionally of only one desired denomination—that are ATM-fit, were assigned an authenticity class with high requirements for authenticity, i.e. strict authenticity criteria, and are in a desired position, i.e. a certain printed pattern is visible from above and optionally aligned in a certain way. A second output pocket, the so-called reject pocket, receives those bank notes that could not be assigned an authenticity class and/or are not in a desired position and/or optionally do not belong to the desired denomination. This output pocket optionally also receives faultily drawn-in and/or transported bank notes, e.g. double picks or folded bills. Finally, a third output pocket receives all other bank notes, i.e. fit, unfit and ones that were assigned an authenticity class with lower requirements for authenticity, i.e. less strict authenticity criteria. If for example a stack of bank notes of a certain denomination is inputted in a mixed position, this sorting mode permits those bank notes of a certain denomination to be sorted out that are authentic with high probability, ATM-fit and simultaneously have a desired position. Bank notes that meet these criteria can then be provided for immediate further output, e.g. in a self-service recycling machine.

FIG. 2 shows the schematic structure of an authenticity testing system using authenticity criteria determined on counterfeit documents. The mode of functioning of such a system differs from the example shown in FIG. 1 mainly in that the authenticity test done in evaluation device 16 is performed in two steps. In a first step, the authenticity test is done using authenticity criteria, which are preferably divided into authenticity classes. The authenticity class can be selected in dependence on the determined fitness of document 10 under test, as explained above in connection with FIG. 1. If the measured authenticity features meet the given authenticity criteria, document 10 is assigned the corresponding authenticity class. In a second step of the authenticity test, an additional test is done using authenticity criteria determined on known counterfeit documents. Said authenticity criteria are determined in bank note testing machines suitable for this purpose, e.g. in a central bank or at a corresponding service provider. For reasons of data reduction there are preferably authenticity criteria that are characteristic of the difference between a counterfeit and an authentic document. The authenticity criteria used in the second step of the authenticity test are transferred in the shown example from control device 31, e.g. a server of a central bank or central service provider, over wire-bound or wireless connection 32 to one or more test stations 30 simultaneously. The corresponding data can also be transferred by means of suitable data carriers, e.g. flash card, memory chips, floppy, CD or DVD. If a corresponding characteristic difference is now ascertained in the second step of the authenticity test, document 10 can be identified as a forgery with high probability even if it meets the authenticity criteria in the first step of the authenticity test. The chronological order of the two steps can fundamentally be selected at will.

Altogether, this system permits simple and fast updating of features and criteria for testing the authenticity of bank notes in any number of test stations 30 simultaneously, thereby guaranteeing high reliability in the recognition of counterfeit bank notes that are in circulation.

FIG. 3 shows the schematic structure of a system for applying the inventive authenticity testing. Documents 10, bank notes in this example, are deposited at commercial bank 39 by a depositor. The deposit can be made e.g. at the terminal of a self-service recycling machine. In test station 30, which can be part of the terminal, the bank notes are tested for authenticity. If the bank notes meet the very strict authenticity criteria of a selected authenticity class, they can be provided for immediate further output, for example at the same terminal, other output terminals 34 and/or bank teller window 36. All bank notes that do not meet these very strict authenticity criteria are supplied to central testing device 35, for example in central bank 40, to be subjected to further authenticity testing, this testing also using so-called high-security features that guarantee especially reliable recognition of counterfeit bank notes. Bank notes that meet these criteria can now be put back into circulation by being returned to commercial bank 39 to be paid out at output terminals 34 or bank teller window 36.

This example furthermore includes controller 31 in which counterfeit bank notes are used to determine additional authenticity criteria—as stated above in the description for FIG. 2—that relate to characteristic differences between authentic bank notes and bank notes recognized as forgeries in central testing device 35. The forgeries can be transferred directly from testing device 35 to controller 31. The authenticity criteria determined there are then transferred over connection 32 to test station 30 and can be used there—optionally in addition to the authenticity criteria divided into different authenticity classes—for testing the authenticity of bank notes.

To permit deposited forgeries to be retraced, characteristic data of the deposited bank notes, e.g. printed images and/or serial numbers, can in addition be stored in control device 31 together with data on the depositor, e.g. account number and/or personal identification number (PIN). If a bank note is recognized as a forgery in central testing device 35, characteristic data of the bank note, e.g. printed images and/or serial numbers, are transferred to control device 31. There, comparison of the stored data with the transferred data permits the depositor of the counterfeit bank note to be identified. Controller 31 can either be installed inside commercial bank 39, as shown, or be located outside the same, for example at a central service provider.

The system shown in FIG. 3 deals by way of example with the application of the inventive method for testing the authenticity of bank notes in a depositing machine at a commercial bank. However, the authenticity testing can fundamentally also be done in a bank note processing machine in which bank notes are inputted by an employee for testing and/or sorting, e.g. after being deposited at the teller window of a commercial bank. The authenticity testing and the subsequent course of the method involving sorting, reissue and/or transfer for testing in a central bank are analogous.

The invention claimed is:

1. A method for retracing a deposited counterfeit banknote, comprising:

storing characteristic data of deposited banknotes in a control device together with data of a depositor of said banknotes;

transferring said deposited banknotes to a central testing device;

recognizing a banknote of said deposited banknotes as a counterfeit banknote in said central testing device;

transferring characteristic data of the counterfeit banknote from the central testing device to the control device; and identifying the depositor of the counterfeit banknote in the control device by comparing the stored characteristic data with the transferred characteristic data of said counterfeit banknote.

2. The method according to claim 1, wherein the control device is a controller installed inside a commercial bank where the counterfeit banknote is deposited.

3. The method according to claim 1, wherein the control device is a controller installed at a central provider of a commercial bank where the counterfeit banknote is deposited.

4. The method according to claim 1, wherein the characteristic data are printed images or serial numbers.

5. The method according to claim 1, wherein the data of the depositor are an account number or a personal identification number of the depositor.

6. An apparatus for retracing a deposited counterfeit banknote, comprising:

a control device configured to store characteristic data of deposited banknotes together with data of a depositor of said banknotes;

a testing device in communication with said control device, the testing device being configured to recognize a banknote of said deposited banknotes as a counterfeit banknote and to determine and forward characteristic data of said counterfeit banknote to said control device;

wherein said control device is configured to receive said characteristic data of a counterfeit banknote and to identify a depositor of the counterfeit banknote by comparing the stored characteristic data with the received characteristic data of the counterfeit banknote.

7. The apparatus according to claim 6, wherein the control device is a controller installed inside a commercial bank where the counterfeit banknote is deposited.

8. The apparatus according to claim 6, wherein the control device is a controller installed at a central provider of a commercial bank where the counterfeit banknote is deposited.

9. The apparatus according to claim 6, wherein the characteristic data are printed images or serial numbers.

10. The apparatus according to claim 6, wherein the data of the depositor are an account number or a personal identification number of the depositor.

11. An apparatus for retracing a deposited counterfeit banknote, comprising:

a control device configured to store characteristic data of deposited banknotes together with data of a depositor of said banknotes;

a plurality of test stations in communication with said control device, said test stations being configured to recognize a banknote of said deposited banknotes as a counterfeit banknote and to determine and forward characteristic data of said counterfeit banknote to said control device;

wherein said control device is configured to receive said characteristic data of a counterfeit banknote from said test stations and to identify a depositor of the counterfeit banknote by comparing the stored characteristic data with the received characteristic data of the counterfeit banknote.

12. The apparatus according to claim 11, wherein the control device is a server of a central bank or central service provider.

13. The apparatus according to claim 11, further comprising a wired or wireless communication connection between said control device and each of said test stations.

14. The apparatus according to claim 11, wherein said plurality of test stations comprises a plurality of bank note testing machines.

* * * * *